United States Patent
Ghislieri et al.

(10) Patent No.: US 9,150,251 B2
(45) Date of Patent: Oct. 6, 2015

(54) MOTOR VEHICLE PROVIDED WITH A RELEASE SYSTEM TO UNCOUPLE A CROSS MEMBER IN THE ENGINE COMPARTMENT IN THE EVENT OF A FRONT CRASH

(71) Applicant: Fiat Group Automobiles S.p.A., Turin (IT)

(72) Inventors: Daniele Ghislieri, Turin (IT); Sergio Bianco, Turin (IT); Gianfranco Del Nero, Turin (IT); Lorena Iezzi, Turin (IT)

(73) Assignee: Fiat Group Automobiles S.p.A., Turin (IT)

( * ) Notice: Subject to any disclaimer, the term of this patent is extended or adjusted under 35 U.S.C. 154(b) by 95 days.

(21) Appl. No.: 14/297,850

(22) Filed: Jun. 6, 2014

(65) Prior Publication Data

US 2014/0360798 A1    Dec. 11, 2014

(30) Foreign Application Priority Data

Jun. 7, 2013   (IT) .............................. TO2013A0474

(51) Int. Cl.
*B62D 21/15*   (2006.01)
*B62D 21/11*   (2006.01)

(52) U.S. Cl.
CPC .............. *B62D 21/155* (2013.01); *B62D 21/11* (2013.01)

(58) Field of Classification Search
CPC .... B65D 21/11; B65D 21/152; B65D 21/155; B60G 2204/15
USPC ........... 180/232, 274, 312; 280/784, 124.109; 296/187.08, 187.09, 193.07, 193.09, 296/203.02, 204
See application file for complete search history.

(56) References Cited

U.S. PATENT DOCUMENTS

| | | | | |
|---|---|---|---|---|
| 5,372,216 A | * | 12/1994 | Tsuji et al. ..................... | 180/274 |
| 5,992,555 A | * | 11/1999 | Sakamoto et al. ............ | 180/232 |
| 6,722,696 B2 | * | 4/2004 | Sonomura et al. ............ | 280/784 |
| 6,761,242 B2 | * | 7/2004 | Yoshida et al. ............... | 180/298 |
| 7,040,446 B2 | * | 5/2006 | Anzai et al. ................... | 180/312 |
| 7,229,099 B2 | * | 6/2007 | Reim et al. .................... | 280/784 |
| 7,393,016 B2 | * | 7/2008 | Mitsui et al. .................. | 280/784 |
| 8,480,102 B2 | * | 7/2013 | Yamada et al. ........ | 280/124.109 |
| 8,490,988 B2 | * | 7/2013 | Takeshita et al. ...... | 280/124.109 |
| 2006/0181071 A1 | | 8/2006 | Mitsui et al. | |
| 2011/0198889 A1 | | 8/2011 | Takeshita et al. | |
| 2013/0200653 A1 | * | 8/2013 | Yasui et al. .............. | 296/187.08 |

FOREIGN PATENT DOCUMENTS

EP   1 361 099 A2   11/2003
JP   2002-274194 A   9/2002

\* cited by examiner

*Primary Examiner* — Paul N Dickson
*Assistant Examiner* — Laura Freedman
(74) *Attorney, Agent, or Firm* — Dickstein Shapiro LLP

(57) ABSTRACT

A motor vehicle has two upper struts, which project forward from a passenger compartment and are arranged above two lower struts, which extend along respective substantially rectilinear axes inclined from the bottom upwards, going forward; the lower struts have respective intermediate portions with such a variation in cross section to define a preferential bending zone; the rear ends of the lower struts are fixed to a cross member connected to the upper struts by means of two connection members, which are substantially vertical and have respective breakable zones designed so as to break when a given load threshold is exceeded; the motor vehicle also has a powertrain connected to the cross member and to the upper struts by means of supports which are distinct from the connection members and are breakable in the event of a front crash.

6 Claims, 8 Drawing Sheets

MOTOR VEHICLE PROVIDED WITH A RELEASE SYSTEM TO UNCOUPLE A CROSS MEMBER IN THE ENGINE COMPARTMENT IN THE EVENT OF A FRONT CRASH

The present invention relates to a body of a motor vehicle provided with a release system for uncoupling a cross member in the engine compartment in the event of a front crash.

BACKGROUND OF THE INVENTION

As is known, the body of motor vehicles is designed to obtain adequate safety for the passengers in the event of accidents. In particular, to sustain the load due to front crashes, longitudinal struts are provided in the front engine compartment of the motor vehicles, the struts having collapsible zones for absorbing energy.

Generally, the front end of the motor vehicle is supported by two main struts and by two lower struts, arranged under the main struts. The rear ends of the two lower struts are connected by a cross member, which supports the front suspensions and the powertrain (defined by the engine and by the gearbox of the motor vehicle).

In the event of front crash at a high speed, there is a need for the powertrain to deform the structure defining the passenger compartment as little as possible, to prevent injuries to the legs of the driver and front passenger in the motor vehicle. There is also a need to minimize the deceleration for the occupants in the passenger compartment. To meet these needs, normally a release system of pyrotechnic type is provided which, in the event of a crash, explodes and causes the release of the cross member, so as to let the powertrain fall.

The need is felt to simplify the solutions of the type described above, by eliminating the pyrotechnic devices for uncoupling the cross member.

Patent EP1361099, which corresponds to the preamble of claim 1, describes a sub-frame which is arranged under the two main struts and which comprises two longitudinal elements, a front cross member and a rear cross member. The two longitudinal elements have a notch which promotes downwards bending thereof when the front end of the motor vehicle is subjected to a front crash of a greater entity than a given threshold. The powertrain is supported by two lateral connection members, each of which is fixed, at the top, to a main strut and, bottomly to a longitudinal element of the sub-frame. The two connection members in EP1361099 have a notch which determines the breaking thereof when the load reaches a specific threshold during the bending of the longitudinal elements of the sub-frame, so as to uncouple the powertrain from the main struts.

The powertrain thus remains constrained only to the sub-frame, which, by bending, moves downwards and drags the powertrain with it.

The drawback of this solution lies in the fact that powertrain assembly is forced to move back together with the sub-frame, during the plastic deformation of the latter, hence there is a risk that it may in any event crash and deform the structure defining the passenger compartment.

SUMMARY OF THE INVENTION

It is the object of the present invention to make a motor vehicle provided with a release system for uncoupling a cross member in the engine compartment in the event of a front crash, which allows the above-described drawback to be resolved in a simple and affordable manner.

According to the present invention, a motor vehicle is made, provided with a release system for uncoupling a cross member in the engine compartment in the event of a front crash, as defined in claim 1.

BRIEF DESCRIPTION OF THE DRAWINGS

To better understand the present invention, a preferred embodiment thereof is now described, by way of a mere non-limiting example, with reference to the accompanying drawings, in which.

DETAILED DESCRIPTION OF THE DRAWINGS

Figure 1:
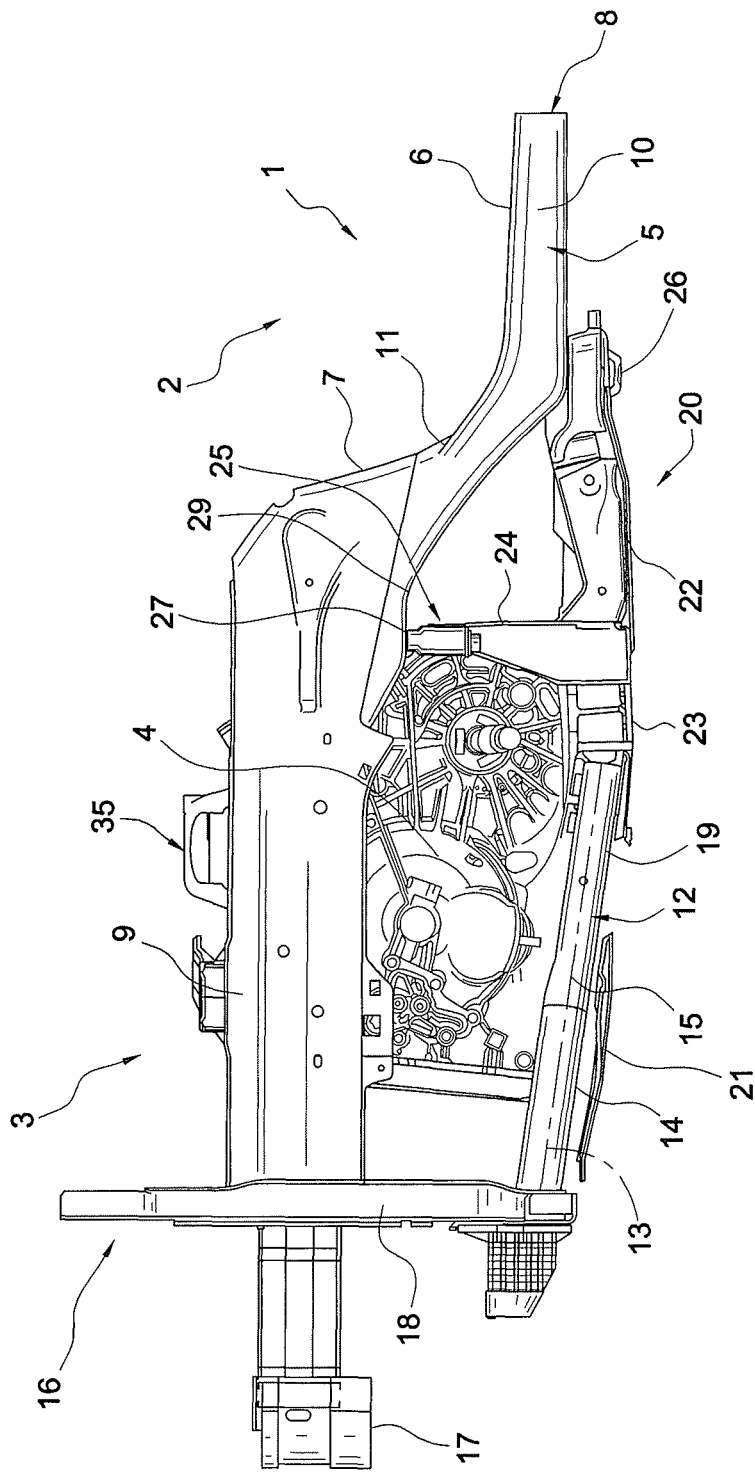
FIG. 1 is a simplified lateral view, and with parts removed for clarity, of a preferred embodiment of the motor vehicle provided with a release system for uncoupling a cross member in the engine compartment in the event of a front crash, according to the present invention.

In FIG. 1, numeral 1 indicates, as a whole, a motor vehicle (partly shown) having a passenger compartment 2 and an engine compartment 3, arranged in front of a lower zone of the passenger compartment 2 and accommodating a powertrain 4, defined by the assembly of an engine and of a gearbox.

The lower zone of the passenger compartment 2 is delimited bottomly by a vehicle floor 6 and frontally by a substantially vertical wall 7, called "fire-protection panel".

The vehicle floor 6 and wall 7 form part of a body 5 which further comprises two longitudinal members 8, only one of which is shown in FIG. 1. The longitudinal members 8 comprise respective front struts 9, which are substantially parallel to the direction of advance of the motor vehicle 1, project forward from wall 7, starting from a higher point with respect to the vehicle floor 6, and are flanked in horizontal direction by the front wheelhouses (not shown) of the motor vehicle 1. The longitudinal members 8 further comprise respective rear portions 10, arranged at the vehicle floor 6, and respective inclined portions 11, which are arranged along wall 7 and join the portions 10 to the struts 9.

Body 5 further comprises a pair of secondary struts (not shown), which are arranged above the wheelhouses and project forward from the front uprights which support the doors of the motor vehicle 1.

The motor vehicle 1 further comprises two lower struts 12, which are arranged under the struts 9 and have respective rectilinear axes 13, with an inclination from the bottom upwards in lateral view, and with an inclination from the exterior towards the interior in the view from the bottom (FIG. 4), if considered in the direction that goes from the passenger compartment 2 forward. In particular, it is worth noting that the upwards inclination is greater than 7° with respect to the longitudinal axis of the struts 9. Each strut 12 comprises a front portion 14 with constant section, for example with circular section, and an intermediate portion 15, having a variation in cross section such as to define a decrease of the flexural strength (moment of flexural inertia) about a horizontal transverse direction of the axes 13 and, therefore, to define a preferential bending zone, planned in the project, when a longitudinal load due to a front crash is of greater entity than a given threshold and causes the collapse of the front ends of the struts 9. Preferably, the variation in cross section is defined by a stake in vertical direction. As an alternative, for example, the variation in cross section may be defined by a weakening, e.g. a notch.

Preferably, the struts 12 are defined by tubes, so as to optimize the weight of body 5.

Figure 4:
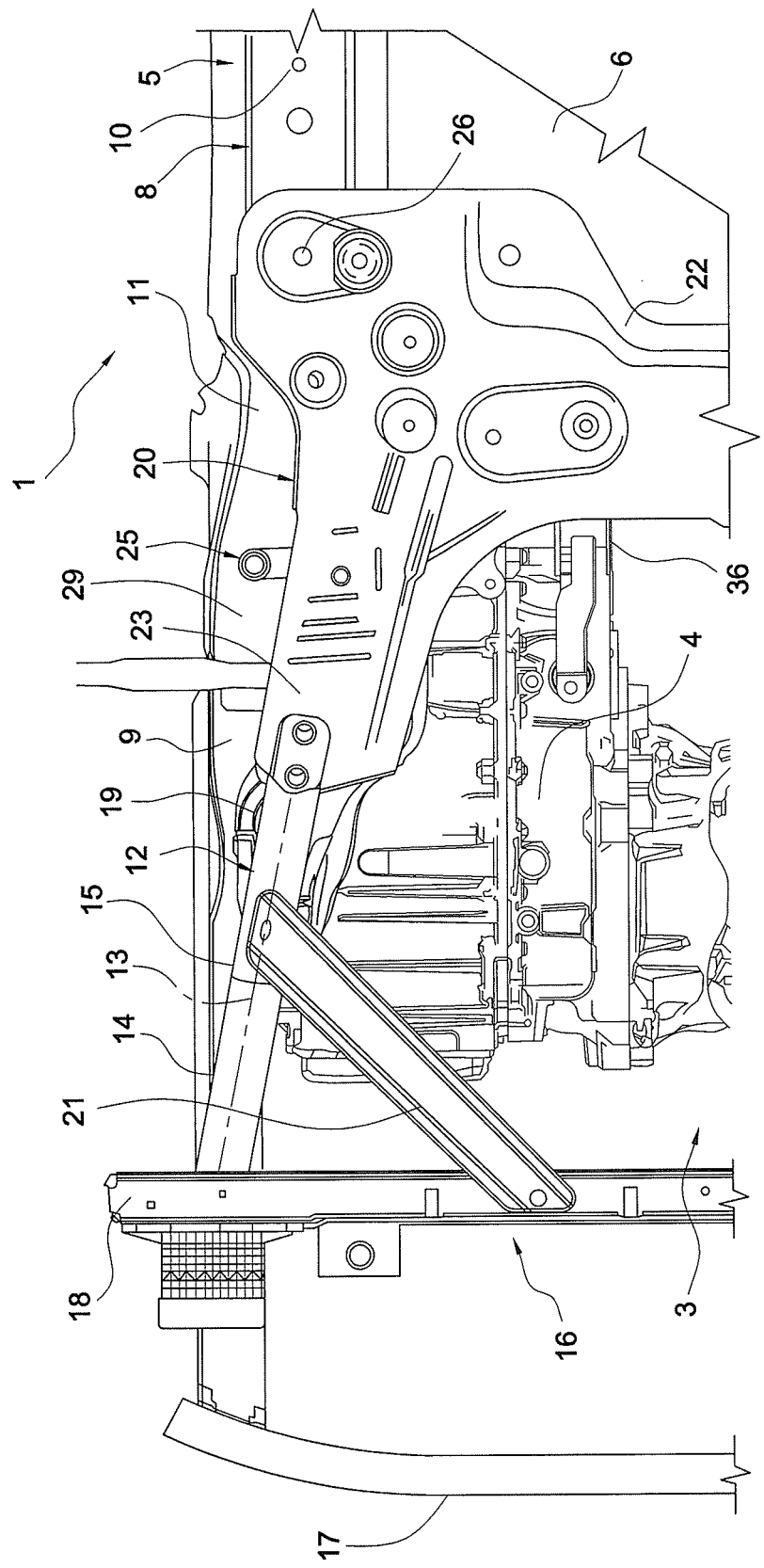
FIG. 4 is a simplified and partial view from the bottom, of the engine compartment in FIG. 1.
Figure 5:
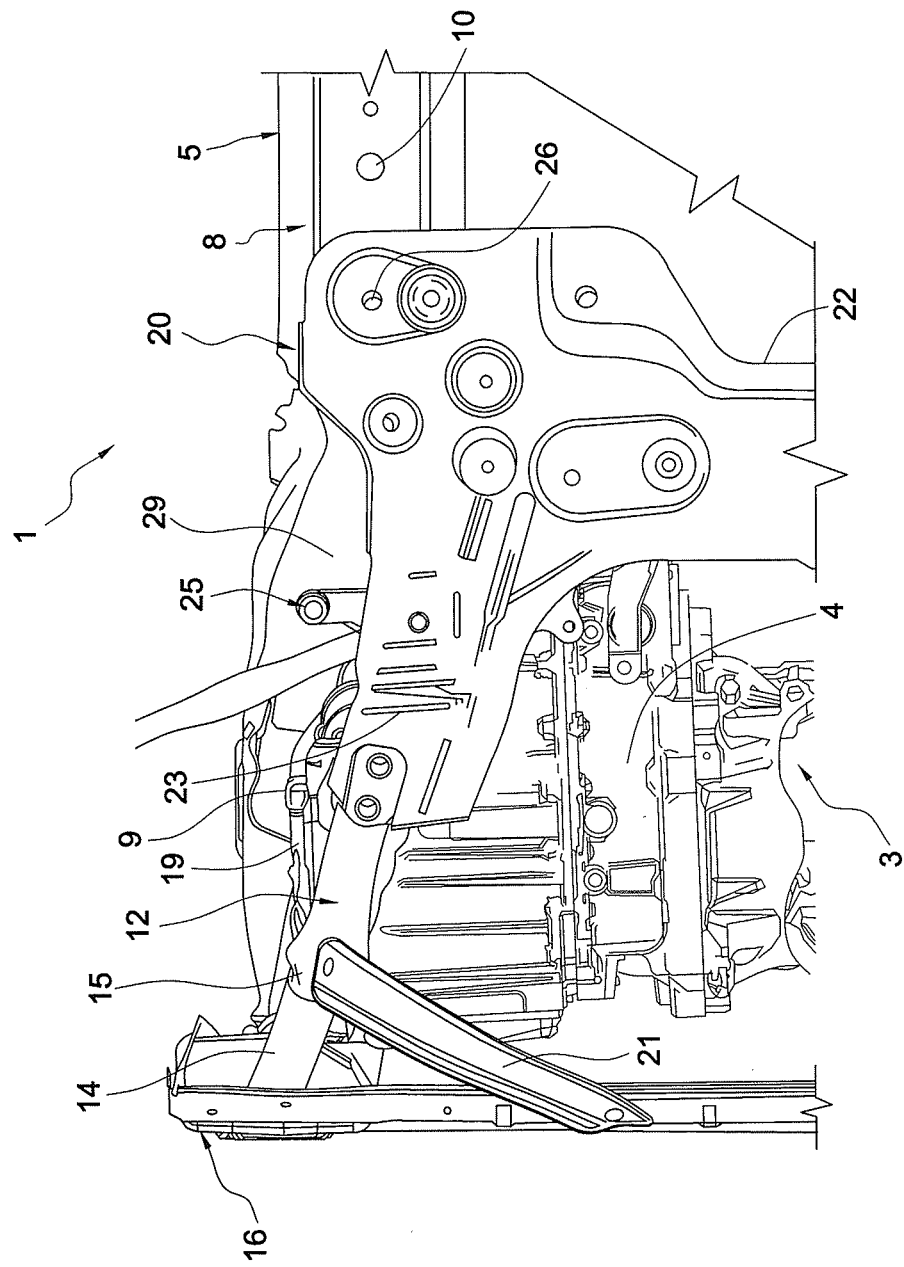
FIG. 5 is a view from the bottom, of the engine compartment in FIG. 3.

As shown in FIGS. 1 and 4, the front ends of the struts 9 and 12 support a frame 16, which is annular in shape so as to surround a heat exchanger assembly (not shown) and which supports such an assembly and a bumper 17. In particular, frame 16 comprises an upper cross member, a lower cross member, and two lateral uprights 18, which are normally called vertical links and are fixed directly or indirectly to the front ends of the struts 9 and 12.

As shown in the view from the bottom in FIG. 4, preferably the portions 15 are connected to the lower cross member of frame 16 by means of respective brackets 21. The brackets 21 serve the purpose of stiffening the front end of the motor vehicle in order to reduce noise.

The struts 12 comprise respective rear portions 19 fixed, in known manner and not described in detail, to a cross member 20 (partly shown), which comprises preferably a transverse rear portion 22 and two front arms 23, which support the front wheels of the motor vehicle 1 by means of respective suspensions, in known manner and not shown. Always considering the view from the bottom, the arms 23 are substantially aligned with the struts 12 and join the latter with the lateral ends of portion 22. Considering the side view in FIG. 1, on the other hand, under non-deformed condition, portion 22 and the arms 23 are substantially horizontal.

Again with reference to FIG. 1, the cross member 20 further comprises two brackets 24, which extend upwards starting from the arms 23 and are connected to the rear ends of the struts 9 by means of respective connection members 25, defining the front connections of the cross member 20.

The cross member 20 is also fixed to the portions 10 of the longitudinal members 8 by means of rear connections 26 not described in detail.

The connection members 25 extend in substantially vertical directions and comprise respective weakened or breakable zones 27, designed so as to break and therefore uncouple the cross member 20 from the struts 9 when a given threshold load is reached.

Figure 6:
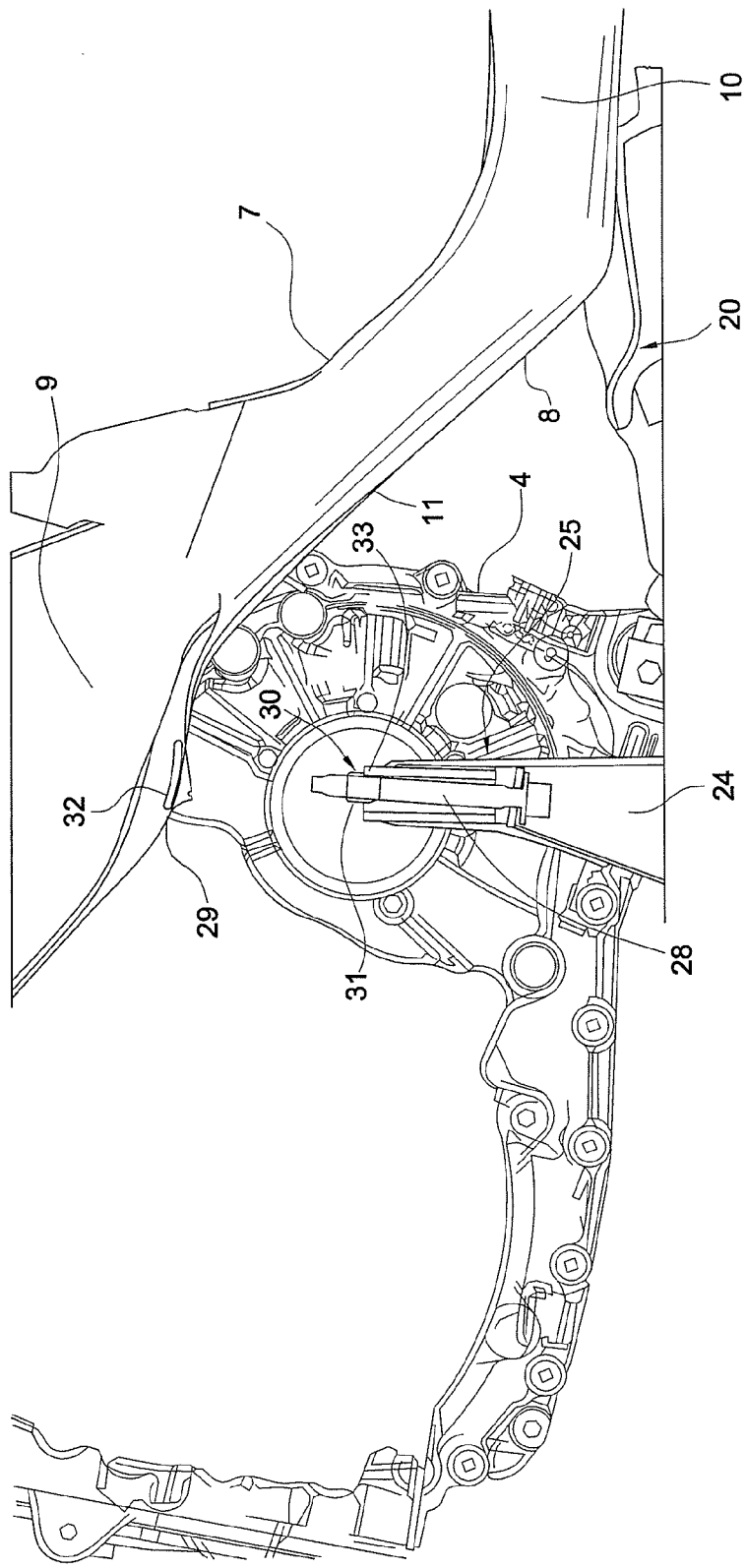
FIG. 6 shows a detail in FIG. 3, on enlarged scale.

In particular, the connection members 25 are generally called "stanchions" and, as shown in FIG. 6, comprise respective tie rods 28, whose upper ends are threaded and project through respective walls 29, which are part of the struts 9. The connection members 25 further comprise respective bushings 30, each of which comprises in turn a nut screw 31, screwed onto the upper end of the tie rod 28, and a flange 32 which projects radially from an edge 33 of the nut screw 31 and has a lower face resting on wall 29. In particular, for each side of the motor vehicle 1, the weakened zone 27 is defined by a portion of flange 32 near edge 33, so as to allow the separation of the nut screw 31 from flange 32 when the aforesaid threshold load is reached, as shown precisely in FIG. 6: the weakened zone 27 is obtained by making flange 32 with a relatively small thickness or by making a notch in flange 32 near edge 33.

Figure 7:
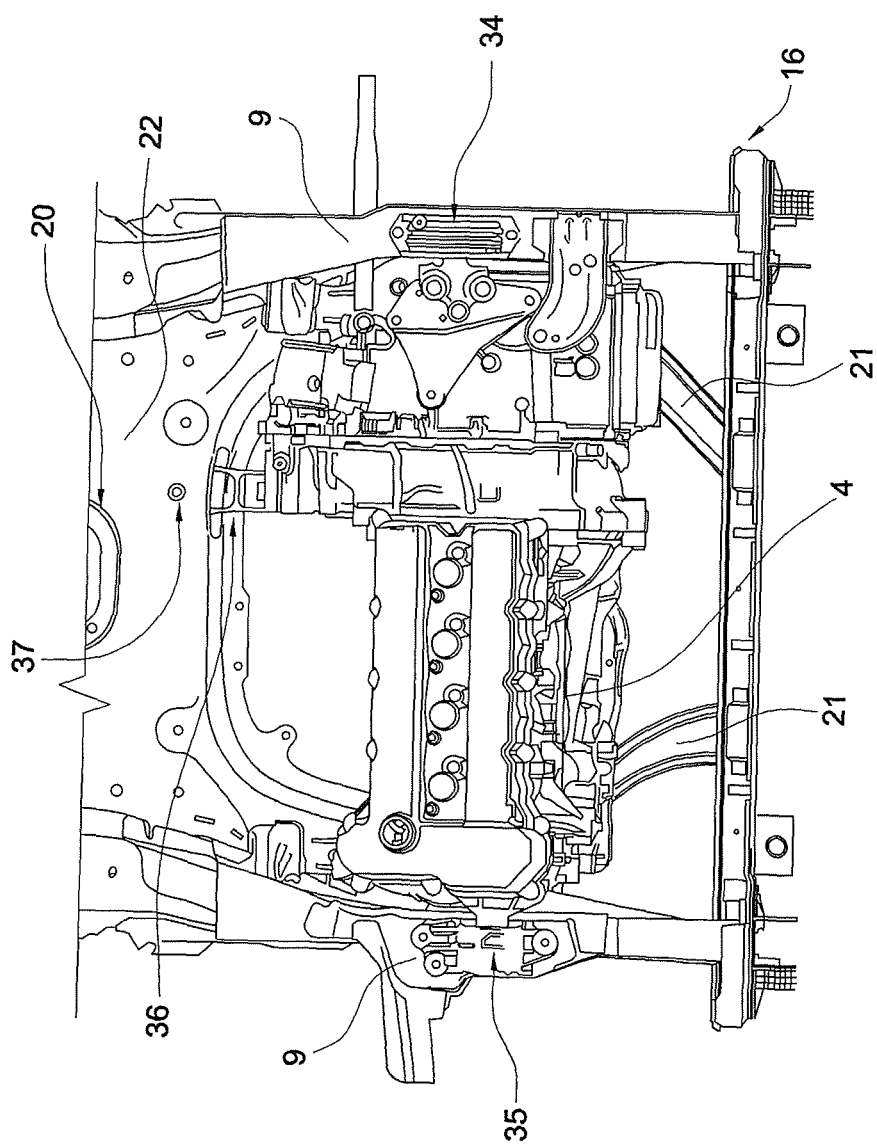
FIG. 7 is a top view related to the method with which a powertrain of the motor vehicle is connected in the engine compartment.

As shown in FIG. 7, powertrain 4 is connected to the struts 9 and to the cross member 20 by means of a plurality of supports, not described in detail, which are preferably three in number and are indicated by numerals 34, 35 and 36. In particular, the supports 34 and 35 connect powertrain 4 to the upper surfaces, respectively, of the struts 9. Support 36 instead connects powertrain 4 to an intermediate zone of portion 22.

Figure 8:
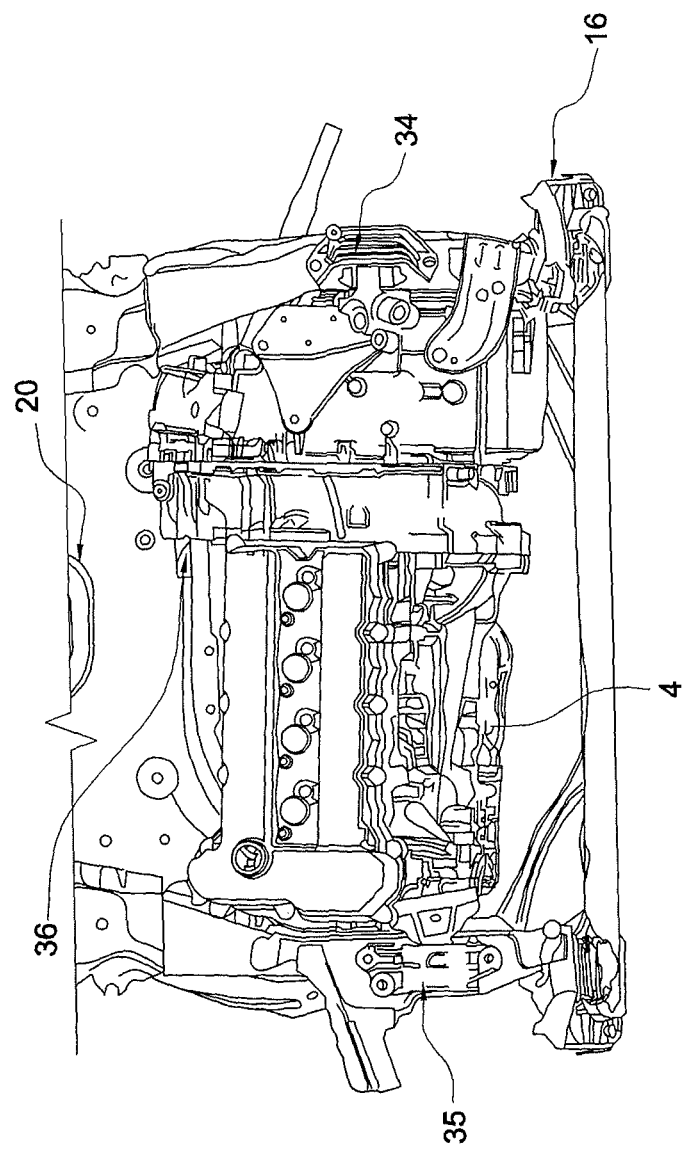
FIG. 8 is similar to FIG. 7 and shows the powertrain during the front crash.

As shown in FIG. 8, the supports 34, 35 and 36 are of breakable type, that is they are designed so as to automatically break in the event of accident with front crash of relatively significant entity, so as to let powertrain 4 uncouple from the struts 9 and from the cross member 20.

Figure 2:
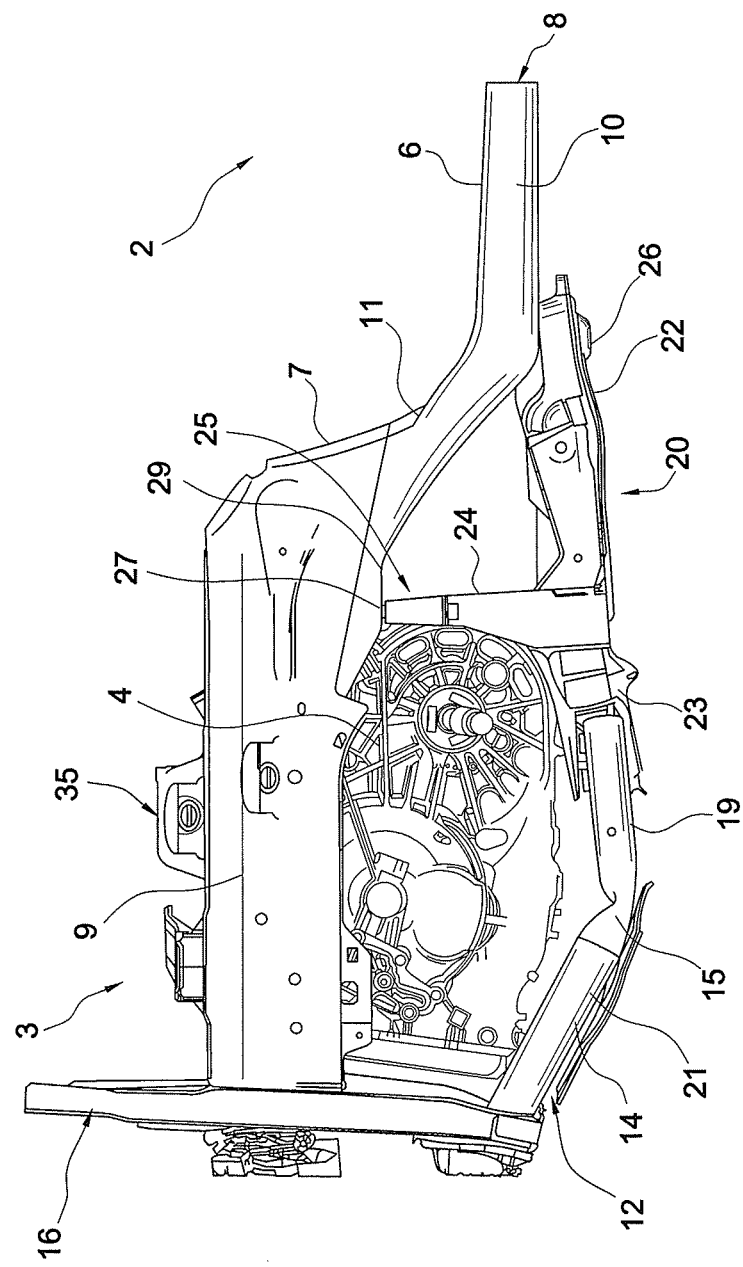
FIGS. 2 and 3 are similar to FIG. 1 and show the engine compartment in FIG. 1 during a front crash simulation.
Figure 3:
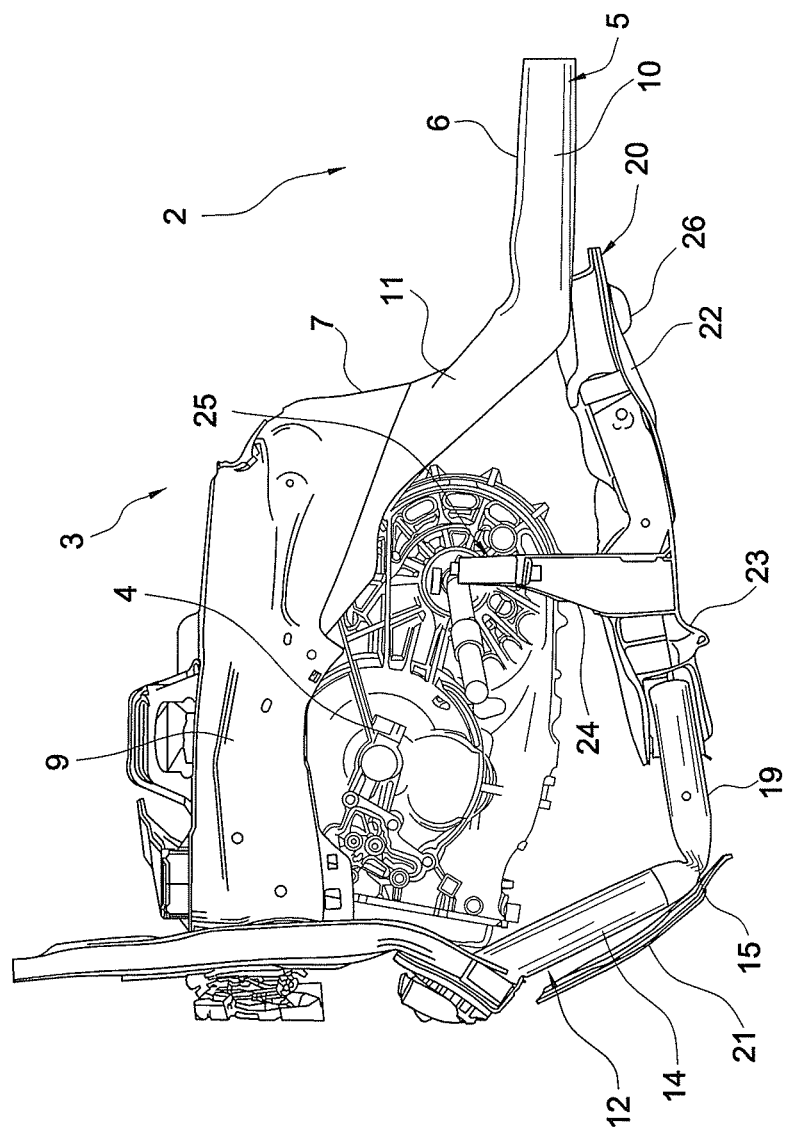

With reference to FIGS. 2 and 3, in the event of a front crash of relatively significant entity, the longitudinal load due to the crash causes a bending of the struts 12 at the portions 15. Such a bending tends to increase the load component transmitted downwards by the portions 14 on the arms 23 and accordingly, on the connection members 25. This overload causes the break of the connection members 25 at the weakened zones 27, and hence, the release of the brackets 24 from the struts 9. In particular, after the breaking of the flanges 32, the nut screws 31 may slip downwards through the walls 29, together with the upper ends of the tie rods 28.

After the breaking, the load transmitted by the portions 14 continues to push the cross member 20 downwards, which therefore tends to rotate downwards, substantially acting as pin about the rear connections 26 (in anti-clockwise direction in FIG. 3), and therefore moves away from the struts 9. Thereby, space is freed for powertrain 4 to move back and descend.

At the same time, the supports 34, 35, 36 break, therefore powertrain 4 is not dragged by the constraint defined by the supports 34, 35 and 36, but moves according to the intensity of the crash and according to the spaces which are created in the engine compartment 3 during the plastic deformation of body 5. In particular, powertrain 4 has sufficient space to avoid knocks against wall 7, since the cross member 20 is rotated downwards and therefore is moved back with respect to the non-deformed condition. In particular, by means of simulations it may be noticed that powertrain 4 moves back with respect to the original position thereof and simply rests against wall 7.

It is therefore apparent that the solution proposed for releasing the cross member 20 from the struts 9 is relatively simple, because it does not have pyrotechnic elements.

Not only, but the connection members 25 and the supports 34, 35 and 36 are distinct elements from each other, and all break in the event of a crash. Thereby, the bending of the struts 12 and the breaking of the connection members 25 allow space to be freed, by lowering the front part of the cross member 20 with respect to the struts 9, while the simultaneous breaking of the supports 34, 35 and 36 leaves powertrain 4 free to move without constraints during the crash, in order to occupy empty spaces which become available precisely due to the effect of the lowering of the cross member 20. Therefore, as mentioned above, powertrain 4 moves back and rests against wall 7 without causing particular deformations in the passenger compartment 2 and without causing particular deceleration peaks on the occupants of the passenger compartment 2.

At the same time, the struts 12 may be designed to only support loads due to crashes, and not to support powertrain 4, therefore the effective plastic deformation thereof during a crash may be planned in the design phase with greater precision, because it substantially does not depend on the weight and on the inertia of powertrain 4.

Furthermore, the features described above allow advantages of simplicity to be obtained with respect to similar bodies of the known art.

Finally, it is apparent from the above that modifications and variants may be made to the motor vehicle 1 herein described with reference to the accompanying drawings, without departing from the scope of protection of the present invention, as defined in the appended claims.

In particular, the cross section of the struts 12 and/or the shape of the cross member 20 and/or the connection members 25 could be different than those indicated by way of example. Furthermore, the weakened zones 27 could be defined by different components than the bushings 30, but anyway part of the connection members 25 and/or of the walls 29 of the struts 9.

The invention claimed is:

1. A motor vehicle (1) comprising:
   two upper struts (9), which project forward from a passenger compartment (2) along respective directions which are substantially parallel to a longitudinal direction of advance of the motor vehicle;
   two lower struts (12), which are arranged under said upper struts (9) and extend along respective substantially rectilinear axes (13); said substantially rectilinear axes (13), in non-deformed condition, being inclined from a bottom upwards, if considered starting from said passenger compartment (2); said lower struts (12) comprising respective intermediate portions (15) having a variation in cross section, defining a reduction in flexural strength about a horizontal direction, transverse to said substantially rectilinear axes (13);
   a cross member (20) fixed to rear ends of said lower struts (12);
   two connection members (25) that are substantially vertical and connect said cross member (20) to respective walls (29) of said upper struts (9);
   release means (27) to uncouple said cross member (20) from said upper struts (9); said release means being defined by breakable zones (27), that define part of said connection members (25) and/or of said walls (29) and are designed so as to break upon exceeding a given load threshold;
   a powertrain (4);
   support means (34,35,36) that support said powertrain (4); characterised in that said support means (34,35,36) are distinct from said connection members (25), connect said powertrain (4) to said cross member (20) and to said upper struts (9) and are breakable in the event of a front crash of the motor vehicle (1).

2. The motor vehicle according to claim 1, characterised in that said connection members (25) comprise:
   respective tie rods (28), whose upper ends are threaded and project through said walls (29);
   respective bushings (30), which comprise respective nut screws (31) screwed to the upper ends of said tie rods (28) and respective flanges (32), that project radially from an edge (33) of said nut screws (31) and have respective lower faces resting on said walls (29).

3. The motor vehicle according to claim 2, characterised in that said breakable zones (27) are defined by a zone of said flanges (32) near to said edge (33).

4. The motor vehicle according to claim 1, characterised in that said cross member (20) comprises a transverse rear portion (22) and two front arms (23), which support front wheels of the motor vehicle (1), project forward from lateral ends of said transverse rear portion (22) and are fixed to the rear ends of said lower struts (12).

5. The motor vehicle according to claim 4, characterised in that said cross member (20) comprises two brackets (24), which extend upwards from said front arms (23) and are connected to rear ends of said upper struts (9) respectively through said connection members (25).

6. The motor vehicle according to claim 1, characterised in that front ends of said upper (9) and lower (12) struts support a frame (16), which has an annular shape and comprises an upper cross member, a lower cross member, and two lateral uprights (18); said intermediate portions (15) being connected to the lower cross member of said frame (16) by means of respective brackets (21).

\* \* \* \* \*